Aug. 9, 1949.  J. W. HEWITT, JR  2,478,485
PAD FORMING MACHINE

Filed April 29, 1947  7 Sheets-Sheet 1

FIG. 1.

Inventor
JOHN W. HEWITT JR.

Attorney

Aug. 9, 1949.   J. W. HEWITT, JR   2,478,485
PAD FORMING MACHINE

Filed April 29, 1947   7 Sheets-Sheet 4

Inventor
JOHN W. HEWITT JR.

By Lee F. Townsend
Attorney

Aug. 9, 1949.  J. W. HEWITT, JR  2,478,485
PAD FORMING MACHINE
Filed April 29, 1947  7 Sheets-Sheet 6

FIG. 7.

Inventor
JOHN W. HEWITT JR.

Aug. 9, 1949. J. W. HEWITT, JR 2,478,485
PAD FORMING MACHINE

Filed April 29, 1947 7 Sheets-Sheet 7

Inventor
JOHN W. HEWITT Jr
By
Attorney

Patented Aug. 9, 1949

2,478,485

UNITED STATES PATENT OFFICE 2,478,485

PAD FORMING MACHINE

John W. Hewitt, Jr., Neenah, Wis.

Application April 29, 1947, Serial No. 744,701

17 Claims. (Cl. 164—28)

This invention relates to the art of cutting web and sheet material to form separate articles shaped in conformity with the configuration of dies mounted on rotary elements past which the material is moved. Specifically, the invention has reference to the making of sanitary pads of cellulosic absorbent material adapted for envelopment in gauze coverings for merchandizing as catamenial receptors. For purposes of compliance with statute, an actually reduced embodiment of the invention is herein shown and described; however, it is to be understood that the invention contemplates and is intended to apply to any purpose and structural embodiment not inconsistent with its scope as hereinafter claimed.

An object of the invention is to provide an apparatus for cutting out pads from a web of material fed between an assembly of die cutter rolls and an anvil roll capable of operation at high speed, with means for conveying the formed pads serially in spaced relation to a plurality of take-off mechanisms operating in timed relation.

Another object is to provide, in an apparatus of such character, novel stripper means operative selectively to remove pads from the conveyor means out of the path of immediately following pads whereby to position the removed pads for subsequent engagement by take-off mechanism by which the pads are transferred to edge processing means and ultimately to wrapping and packaging means.

A further object is to provide a novel assembly of die cutter rolls and cooperating anvil roll and means for mounting the same in service position.

Still another object is to provide an apparatus of the character indicated having novel pad end forming and embossing means.

With these and such other objects in view as will be apparent to those skilled in the art, the invention comprises the novel combination, construction, and arrangement of parts hereinafter described and claimed and illustrated in the accompanying drawings, wherein:

As shown, an embodiment of the invention includes suitable means, indicated generally as a feeding conveyor assembly F, by which a web W of appropriate material is fed into one end of the machine between the rolls of cutter means indicated generally at C. The material here employed is a laminated cellulosic absorbent commonly used in the making of sanitary pads. The web passes between an anvil roll and a series of die-carrying cutter rolls all of which are driven by gearing connection from a power source M here shown as an electric motor. The cutter rolls are disposed radially with respect to the anvil roll. During its passage through the cutter assembly the web is subjected first to a series of pad end shaping and cutting operations, with embossing, and then to a straight line severing to complete formation of the individual pads. After leaving the cutter assembly the pads are subjected to the action of spacer means S by which they are separated for travel in spaced relation longitudinally of the machine to take-off stations disposed serially along the pad conveyor. The take-off stations as here shown are three in number, indicated generally as $T_1$, $T_2$ and $T_3$, but any number compatible with the length of the machine may be employed. At each take-off station the pads there acted upon are removed from the conveyor, given an edge ruffling, and passed to gauze wrapping and packaging means P.

The die cutter assembly shown in Figures 1, 2, 6, 7, and 8 comprises a pair of laterally spaced upright standards 10 secured on a base 11 and mounting between them a central cylindrical anvil roll 12, four die cutter rolls 13, 14, 15 and 16, and a severing roll 17. The axes of all rolls are parallel and extend transversely of the machine, with the die cutter rolls and severing roll disposed radially of the anvil roll in equidistant relation therearound.

The pedestal portion of each standard 10 is formed with an aperture 18 of appropriate size and shape to receive therethrough the plain cylindrical anvil roll 12 whereby to dispose the end of its axial shaft 19 in registry with an upwardly directed vertical slot 20 which opens at its lower end to the aperture 18. The slot 20 is closed at its upper end to define the service position of the anvil roll which is supported on bearings 21 that journal the roll shaft 19. The bearings are adjustable vertically within the side standards on anchor blocks 22 detachably engaged with the side walls of the slots 20.

Each side standard 10 is provided with a plurality of inwardly directed slots open at their outer ends and disposed radially with respect to the axis of the anvil roll shaft 19 when it occupies its service position. In this embodiment of the invention there are five such slots, indicated in Figure 1 at 23, 24, 25, 26, and 27, arranged to mount at their closed inner ends roller bearing assemblies 28. These roller bearing units journal the respective shafts 29, 30, 31, 32, and 33 of the four die cutter rolls 13, 14, 15, 16, and the severing roll 17. Hand wheels 34 are operative to shift the bearing assemblies 28 within their respective housing slots for radial adjustment of the die cutter and severing rolls relative to the anvil roll. The various rolls are driven in synchronism by the power source M through conventional gear train means indicated generally at 35 in Figure 2. The central anvil roll is rotated in a clockwise direction and the die cutter and severing rolls are rotated counter-clockwise.

Each die cutter roll is substantially of the construction disclosed in my copending application Serial No. 683,894, filed July 16, 1946, entitled Die edge grinding method and apparatus. As the various die cutter rolls of the present invention are substantially identical a description of one, specifically the uppermost roll 15, will suffice for all. The body of the roll is provided with diametrically opposed pairs of cylindrical radially disposed sockets 36 which communicate through the center of the roll. These sockets are in a circumferential series adjacent each end of the roll, the axial spacing of the two series determining the longitudinal extent of the pads produced by the apparatus. A bearer ring 37 is secured on each end of the roll body for surface contact with the anvil roll. The diameter of the bearer rings is somewhat larger than that of the roll and determines the depth of cut of the dies.

Figure 7:
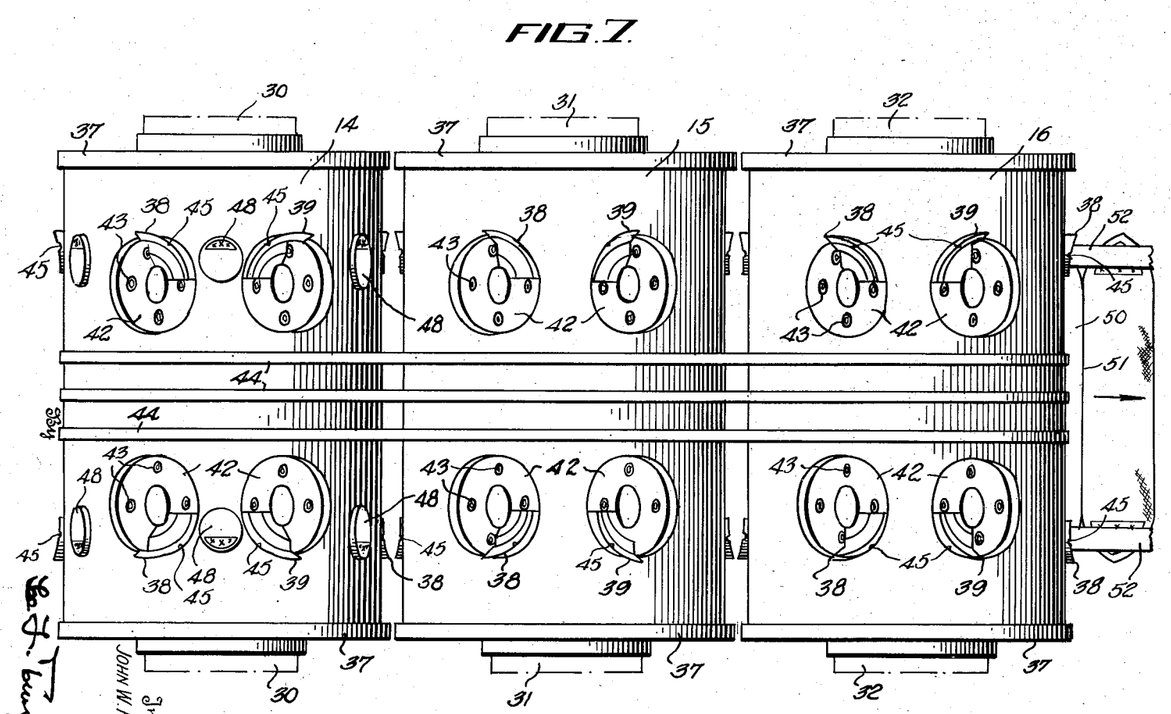
Figure 7 is an enlarged top plan view of the die cutter roll assembly.
Figure 8:
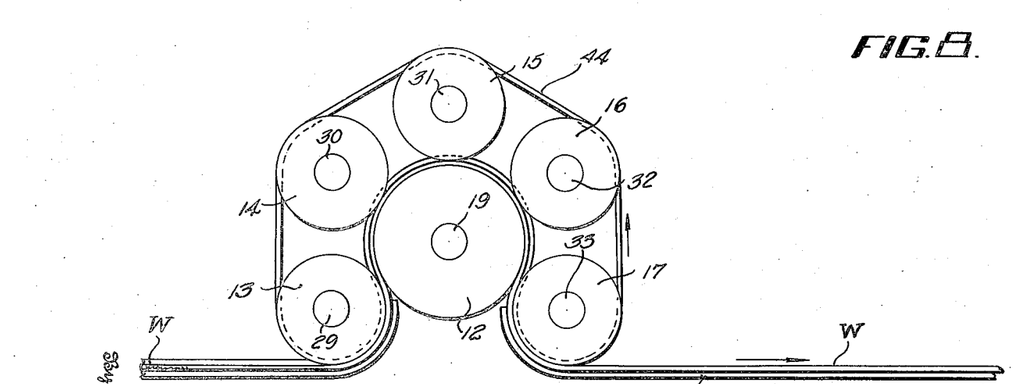
Figure 8 is a schematic plan of the die cutter and anvil roll assembly.
Figure 9:
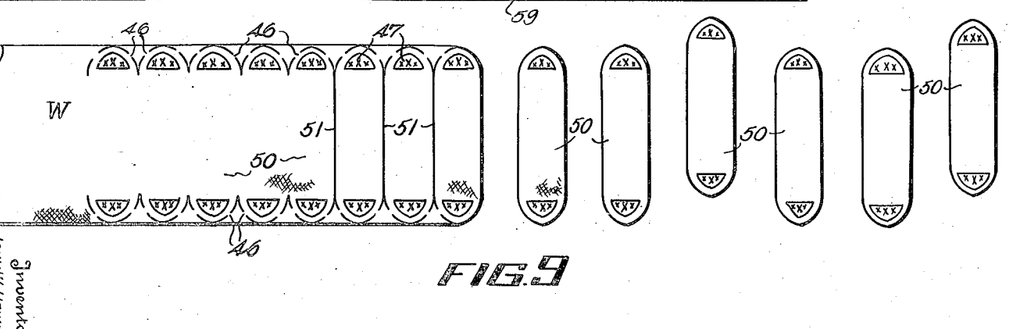
Figure 9 is a top plan view of the material web and pads cut therefrom at various stages of the processing.

The dies themselves are in pairs; one member 38 complementing the other 39. Each has its cutting edge shaped as substantially a quarter segment of a circle having a greater radius of curvature than the circumference of the socket in which it is mounted, and the component members of each pair are oppositely directed as best shown in Figure 7. The arrangement of the dies is such that they impart a scallop cut along each side edge of the material web W as shown in Figure 9. Each die member has a shank portion 40 engaged in its associated socket and a laterally enlarged head 41 seated in a counterbore of the socket. A retainer plate 42 overlies a portion of the die in each socket to anchor the die in service position. Detachable securing elements 43 headed in the retainer plates and threaded into the roll body serve to lock the dies and retainer plates in service position. As the dies function to cut by rolling point contact the cutting edge of each lies at all points on the circumference of a circle having a diameter equal to the external diameter of the bearer rings 37.

The material web W (see Figures 2 and 8) enters the cutter assembly beneath the first die cutter roll 13 and is trained up and over the anvil roll 12 to pass successively between the anvil roll, the four die cutter rolls and the severing roll 17. Its passage through the assembly is facilitated by the fact that it is firmly gripped between the anvil roll and one or more endless belt retainers 44 trained over the series of die cutter rolls and the severing roll. The retainers 44 are here shown as conventional V-belts operating in complemental circumferential grooves in substantially the axial midsection of the rolls. Due to the arrangement of the cutter dies the side edges of the web are cut to form tapered and somewhat rounded pad ends. The provision of four cutter rolls assures that each pad end shall be twice cut on the same curved line of severance, thus eliminating any possibility of jamming or stoppages due to imperfect cuts. The arcs of severance of the cutter dies overlap slightly in order to provide complete cleavage of the material acted upon.

Waste material along the side edges of the web resulting from the scallop cut is prevented from fouling the cutter assembly by being retained on the web until it has passed the cutter rolls. This is accomplished by providing a very small and shallow notch 45, in effect a nick, in substantially the center of each die cutting edge. The effect is to leave small, thread-like connections 46 (shown exaggerated in Figure 9) between the pad end portions and the marginal waste material. These connections are so fragile that the waste material falls away as the material leaves the cutter assembly. While passing through the cutter assembly the pad ends are formed with indicia portions 47 embossed thereon by embossing dies 48 appropriately mounted on one or more of the die cutter rolls between the cutter dies 38 and 39.

The severing roll 17 carried a plurality of straight edge cutter blades 49 secured thereon as a circumferential series extending in parallel spaced relation axially of the roll body. The spacing of these blade cutters 49 determines the width of the individual pads 50, and they are so correlated to the die cutters 38 and 39 that the straight lines of severance 51 occur midway between the apices of the pad end portions. The longitudinal extent of each cutter blade 49 is slightly longer than the linear distance axially of the cutter rolls between the inner ends of the cutting edges of axially registered pairs of the die cutters 38 and 39. Accordingly, the ends of the straight line blades 49 are located a greater distance inwardly from the ends of the roll 17 than are the die cutters 38 and 39 inwardly from the ends of the roll on which they are mounted. This arrangement provides a clearance between the ends of the radially projecting blades 49 and the adjacent bearer rings at the ends of the severing roll 17. Within the clearance space thus provided endless belt pressers 52 are trained over the roll 17 and rearwardly disposed idler pulleys 53 freely rotatable on opposed stub shafts 54 extending inwardly from supporting brackets 55 carried at the head end of the side bars 56 of the pad conveyor frame.

The pad conveyor frame extends rearwardly from the cutter assembly. It is of elongated rectangular form and includes the spaced parallel side bars 56 supported on upright legs 57. At longitudinally spaced intervals horizontal supports 58 are secured to and extend transversely between and beneath the side bars. Bus bars 59, here shown as four smooth surfaced metal bars, are fixedly seated on top of the supports 58 and extend the full length of the frame in parallel spaced relation. At the head end of the frame these bars extend forwardly into the cutter assembly up and around the severing roll 17 to a point just below that at which the blades 49 meet the anvil roll to sever the individual pads. As the pads move down and away from the point of severance they are caught by the bus bars and are slid rearwardly along the bars under the traveling presser belts 52. The position of the pads moving rearwardly under these belts is shown best in Figure 2.

Figure 1:
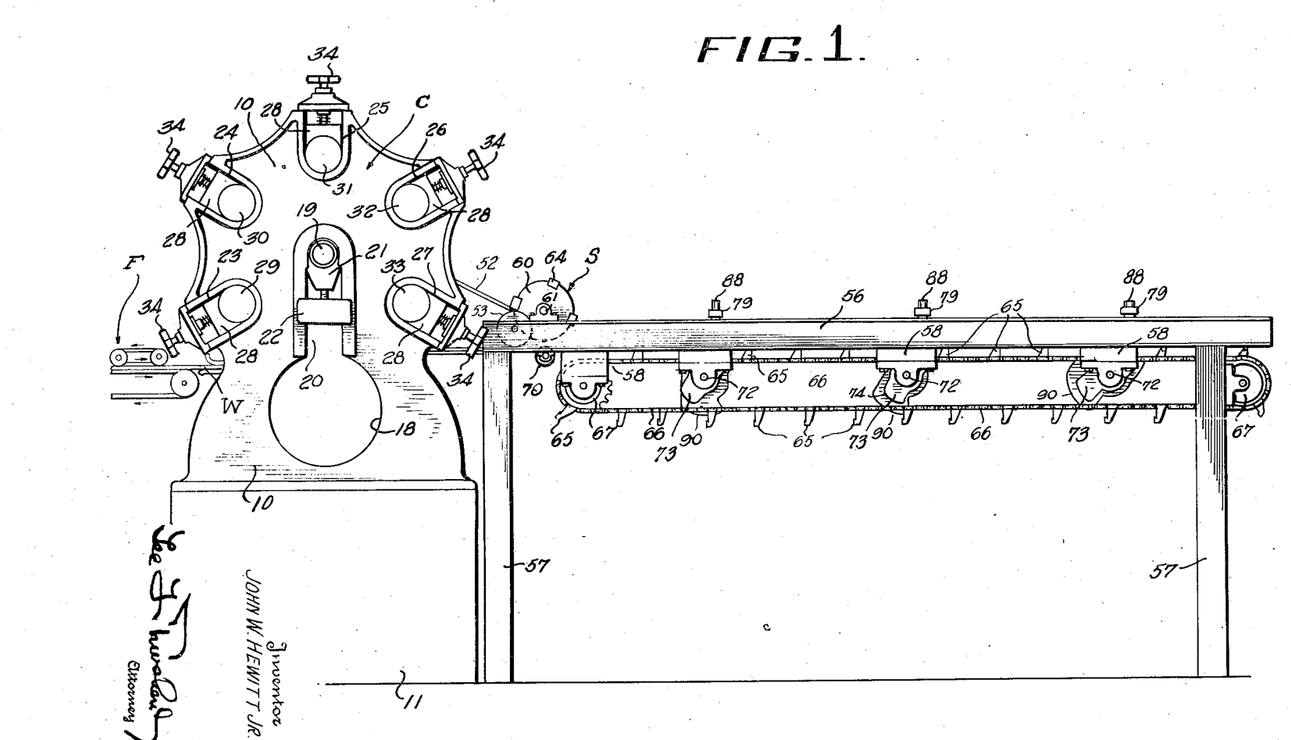
Figure 1 is a side elevation of the apparatus.
Figure 2:
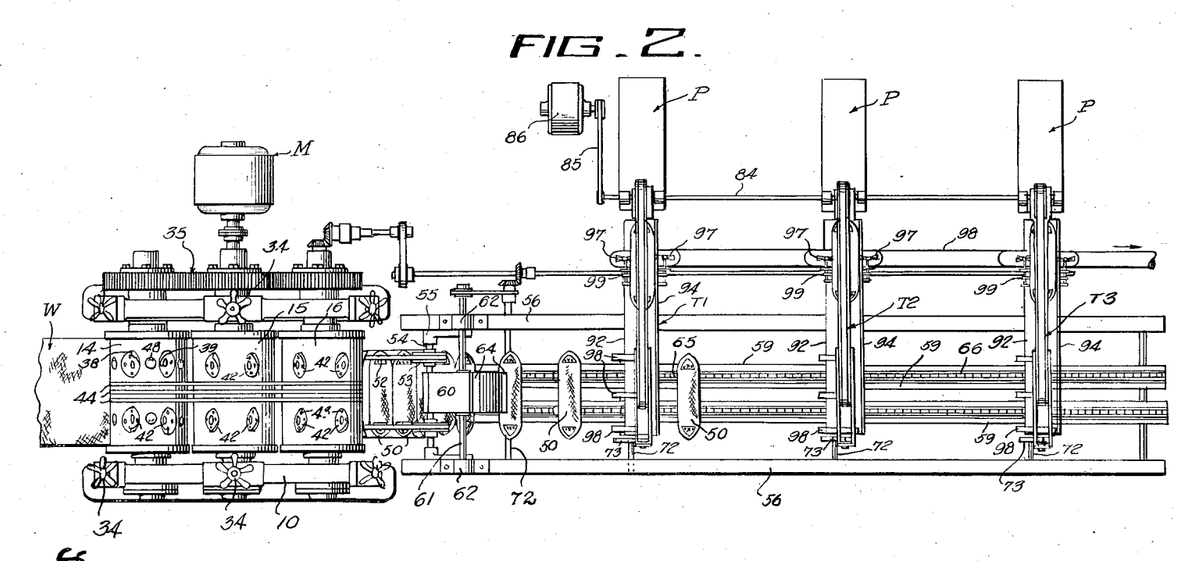
Figure 2 is a top plan view thereof.

As the pads pass rearwardly along the bus bars 59 and leave the belts 52 they are engaged by the spacer means S. This means comprises a roll 60 fixed on a shaft 61 journalled in bearings 62 on the frame side bars. The shaft 61 has a gear train connection 63 with the gearing 35 whereby the spacer roll 60 is caused to rotate at a much faster speed than the rolls of the cutter assembly. The roll 60 extends forwardly between the idler pulleys 53 and is provided with a plurality of axially disposed kicker members 64 which project radially from the roll to engage the pads 50 as they leave the belts 52. As the kicker members are traveling at a much faster speed than the pads the individual pads will be forcibly propelled away from the following series in relatively widely spaced relation as shown in Figure 2. The pads discharged rearwardly along the bus bars by the spacer means are engaged by pusher lugs 65 carried by endless conveyor chains 66.

The conveyor chains are disposed longitudinally of the conveyor frame beneath the bus bars 59 over sprockets 67. The forward sprocket is fixed to a shaft 68 journalled in a support 58 and driven by a gearing connection 69 with the gearing 63 of the spacer roll whereby the pusher lugs 65 move at the same speed as the kickers 64. The pusher lugs 65 project upwardly between the bus bars 59 and extend thereabove a distance slightly greater than the thickness of the pads which they engage and slide along the bus bars.

The pad separating action of the kickers 64 is accelerated by squeeze rollers 70 fixed to a rotatable shaft 71 that extends transversely in the frame beneath the bus bars parallel to the spacer roll shaft 61 and in vertical registry. The rollers 70 are of relatively small diameter but of a size sufficient to extend slightly above the top horizontal plane of the bus bars between which they are disposed. The shaft 71 is appropriately journalled in the frame and may be driven through a gear connection with the gear train 63. If desired the rollers 70 may operate as idlers. Their function is to press the pads up against the kicker members 64 so that the pads are forcibly gripped and propelled along the bus bars where they are picked up by the conveyor pusher lugs 65 and slid rapidly rearwardly along the bars to the take-off means.

Figure 3:
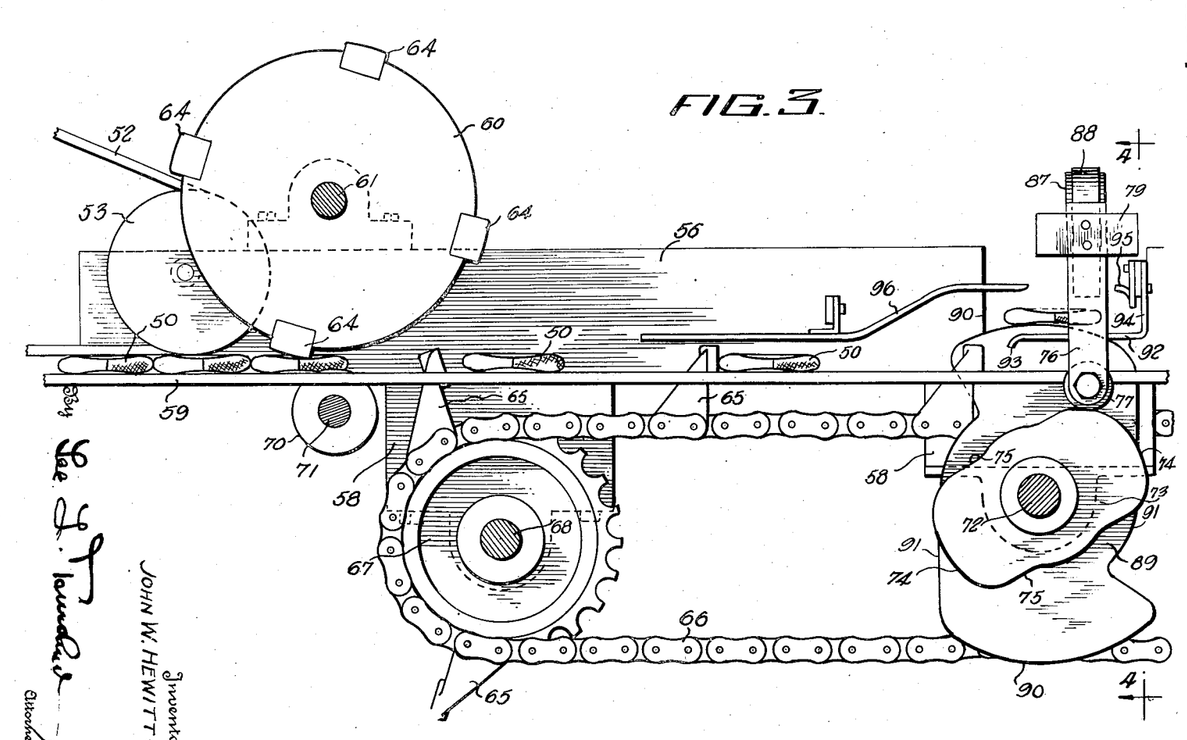
Figure 3 is an enlarged side elevation of a portion of the apparatus including the pad spacer means, conveyor, and first take-off mechanism.
Figure 4:
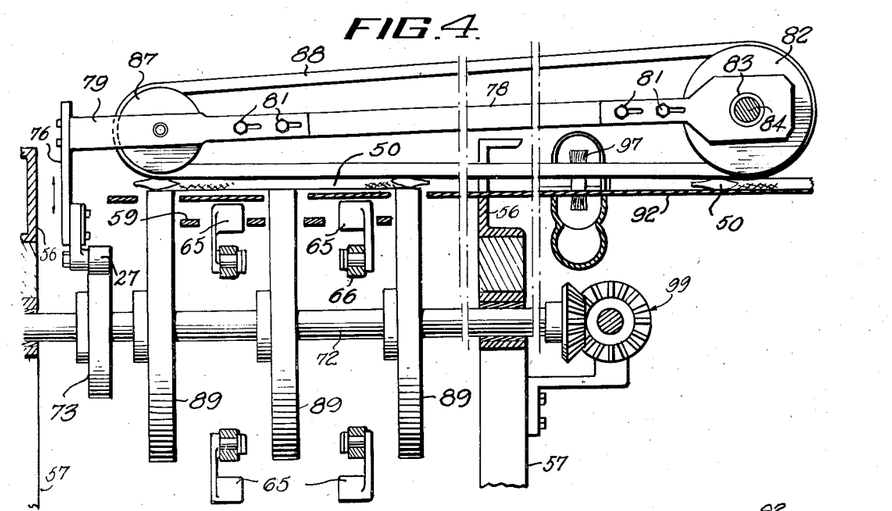
Figure 4 is a vertical section taken substantially on the line 4—4 of Figure 3 with the take-off mechanism operatively engaged with a pad stripped from the conveyor.
Figure 5:
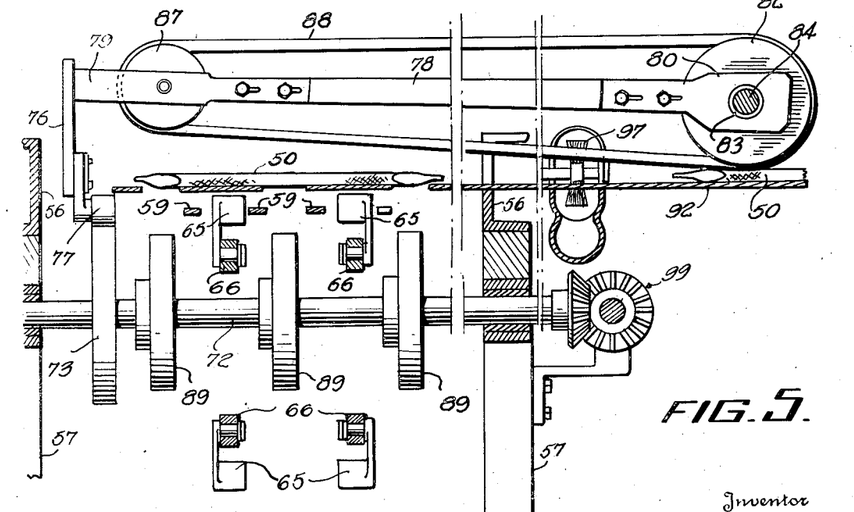
Figure 5 is a section similar to Figure 4 but with the take-off mechanism disengaged.
Figure 6:
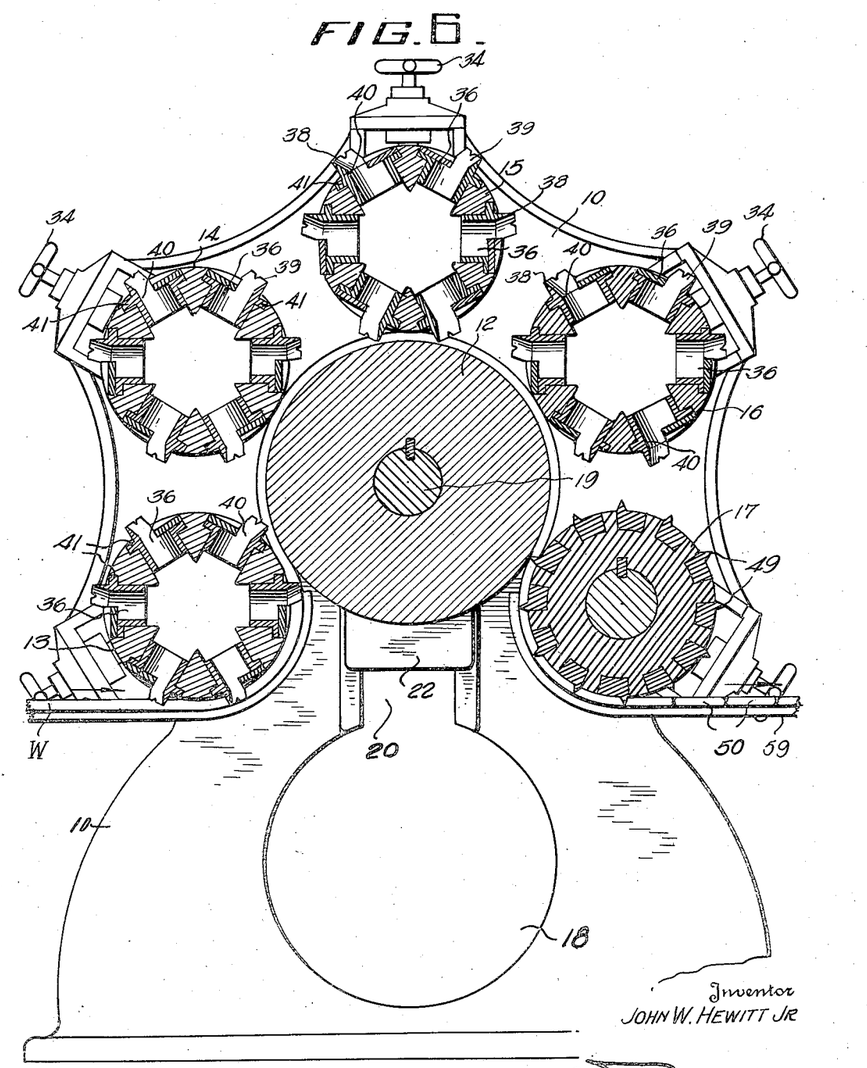
Figure 6 is a vertical section taken longitudinally of the machine through the die cutter and anvil roll assembly.

As the individual take-offs are identical in structure the description of one, specifically T₁, will suffice for all. The mechanism is best illustrated in Figures 3, 4 and 5. A shaft 72 is journalled in the conveyor frame at an appropriate point and extends transversely thereof beneath the upper flight of the conveyor chains 66. At the front side of the machine as viewed in relation to Figure 3 the shaft has fixed thereon for rotation therewith a cam 73 having a pair of diametrically opposed curved riser portions 74 connected by low dwell portions 75. The cam is rotated in a clockwise direction for alternate raising and lowering of a vertically disposed plunger 76 having a roller bearing contact 77 at its lower end on the perimeter of the cam. At its upper end, which is disposed above the bus bars, the plunger 76 has rigid connection to the outer end of a boom 78 which transversely overlies the entire width of the conveyor frame and extends laterally well in back thereof. The boom has a yoke 79 at its front end and a yoke 80 at its back end. These yokes are attached to the shank of the boom for adjustment longitudinally thereon by suitable securing elements 81.

The back end yoke 80 mounts a driven pulley 82 having opposite lateral hub bushings 83 journalled in the arms of the yoke for free rotation therein, whereby the boom has free pivotal connection with the hub portions of the pulley. The pulley itself is fixed on a driven shaft 84 for rotation therewith. As best shown in Figure 2, the shaft 84 parallels the conveyor frame at an appreciable distance behind it, and is common to all of the take-off mechanisms. It is driven by an operative connection 85 with a power source 86, preferably an electric motor.

The front yoke 79 is attached to the shank of the boom for longitudinal adjustment thereon in the same manner as the rear yoke. An idler pulley 87 is journalled in the arms of the front yoke, and a conventional V-belt 88 is trained over the two pulleys of the boom assembly. The belt drive is such that its lower flight travels from front to back; left to right in relation to Figures 4 and 5.

The cam shaft 72 carries three identical cams 89 detachably secured thereon for rotation with the shaft. The central cam is in vertical registry with the space between the inner two bus bars and the front and back cams are, respectively, just in front and in back of the two outer bus bars but within the area overlain by the ends of the pads 50. These cams, shown best in Figure 3, have a diametrically opposed pair of arcuate riser portions 90 joined by low dwells 91. During rotation of the cams the dwells remain always below the bus bars but the risers 90 extend well above the bus bars, at least to a height approximately equal to that of three pads if superimposed. The action of the risers is to engage beneath and lift a pad off the bus bars onto a horizontal pad receiving plate 92 that is rigidly mounted on the conveyor frame to extend transversely across the bus bars in parallel spaced relation thereabove. The plate 92 has a downturned curved lip 93 along its forward edge to facilitate movement of pads as they are slid onto the plate, and it is slotted rearwardly from its forward edge to accommodate passage of the cam risers therethrough as they rise and fall to lift and deposit the pads.

In order to prevent passage of the lifted pads beyond the take-off station the plate 92 is directed upwardly at its rear edge to form a vertical stop wall 94. Attached to the upper edge portion of the stop wall is a forwardly extended check member 95 which cooperates with the belt 88 to assure that the pads stripped from the conveyor will lie flat on the take-off plate.

The setting of the cams on shaft 72 is so arranged that cam 73 operates to swing the boom 78 up in a vertical arc on its pivot at 83 as one set of the risers begins to lift a pad from the bus bars beneath an overhanging guard plate 96 that is mounted in the frame just in advance of the pad plate 92. In the embodiment here disclosed, utilizing three take-off stations, two following pads pass the first take-off station while the risers 90 are moving below the bus bars. As soon as the risers have deposited a pad on the plate 92 the roller 77 of the boom plunger 76 moves to the low dwell 75 of the boom actuator cam 73 and the boom drops down with the lower flight of the belt 88 as shown in Figure 4 resting upon the pad. Frictional engagement of the belt with the pad immediately carries the pad back along the plate 92 away from the conveyor frame until it passes from beneath the back pulley 82 and is discharged to the wrapping and packaging means P. The second and third following pads are, respectively, stripped from the conveyor and discharged at the second and third take-off stations. By the time the third pad has passed beneath the first take-off station the cam 73 at that station has operated to lift the boom to the position shown in Figure 5 and the second set of risers 90 of the cams 89 begin to lift the next following pad for a repetition of the cycle.

It will be apparent that any desired number of take-offs may be employed within the limits imposed by the possible relative speeds of the component parts of the apparatus. It is a matter of timing and cam setting. Conversely, one or more of the take-offs may be disconnected when desired without affecting operation of the others.

In the course of their travel beneath the take-off belts 88 the pads move in the direction of their longitudinal axis and are passed between rapidly rotating brushes 97 which engage the side edges of the pads and fluff the material to soften and open it and neutralize the compression imparted by the severing blades. These edge fluffers are housed in a suction manifold 98 through which the lint is drawn off to a remote point of collection or discharge, not shown. Preferably the rotary brushes 97 are driven by gearing connection 99 with the shafts or gearing which drives the shafts 72.

Use of the apparatus here disclosed enables full advantage to be taken of the high speed operation of rotary cutters. The entire output deliverable at maximum operating speed of the rotary die cutters is easily handled by the series of take-off mechanisms operating in timed sequence.

I claim:

1. In an apparatus for cutting articles from web material, die cutter means operative to shape and sever individual articles, means for feeding material to and for discharging severed articles from the die cutter means, a conveyor receiving articles from said die cutter means, continuously operating article take-off means disposed serially along the conveyor, and means adjacent each take-off means operative to render the same ineffective for intervals corresponding to the passage of one or more articles on the conveyor past that particular take-off means.

2. In an apparatus for cutting articles from web material, a rotary die cutter assembly having a material feed point and an article discharge point, means operative to pass a web of material through said assembly, an endless conveyor disposed to receive at one end articles delivered from said discharge point, driven means adjacent said discharge point operative to engage and space apart articles on the conveyor, a series of article take-off stations spaced apart along the conveyor longitudinally thereof, cam means associated with the conveyor at each take-off station, means operating the cam means to engage and strip off periodically articles moved along the conveyor, article engaging means at each take-off station cooperative with the cam means to move the stripped off articles away from the conveyor, said cam means acting in sequence whereby a station when taking off an article is bypassed by immediately following articles moving along the conveyor.

3. In an apparatus for cutting articles from web material, a rotary die cutter assembly having a feed point and a discharge point, means operative to pass a web of material through said assembly from feed point to discharge point, means in said assembly operative to deliver individual articles serially from the discharge point, a conveyor frame having one end thereof arranged to receive articles discharged from the cutter assembly, a conveyor in said frame operative to move the deposited articles longitudinally along the frame, a series of take-off stations along the frame in spaced relation longitudinally thereof, and article engageable means at each station operative to move articles from the conveyor and away from the frame.

4. In an apparatus for cutting articles from web material, an anvil roll, a die roll, a severing roll, said die roll and severing roll being disposed in circumferential relation to the anvil roll and the axes of all said rolls being parallel, a series of circumferentially spaced cutter dies mounted in said die roll adjacent each end, said dies being registered in pairs axially of the roll, means feeding a web of material between the anvil roll and the die and severing rolls, and a plurality of blades on said severing roll, the length of each blade being slightly longer than the distance between the axially registered pairs of dies on the die roll.

5. In an apparatus for cutting articles from web material, an anvil roll, a die roll, a severing roll, said die roll and severing roll being disposed in circumferential relation to the anvil roll and the axes of all said rolls being parallel, a series of circumferentially spaced cutter dies on said die roll adjacent each end, said dies being registered in pairs axially of the roll, each die having a cutting edge comprising a segment of a circle and the cutting edges of adjacent dies in each series being oppositely directed, and straight edge blades on said severing roll, said blades each being slightly longer than and registering with the space between the inner ends of the die cutting edges axially of the roll.

6. In an apparatus for cutting articles from web material, a cutting assembly comprising a central anvil roll, a series of rolls disposed radially thereof, means operative to move a web over said anvil roll serially beneath and past the other rolls, cutter dies on certain of said radial rolls and having arcuate cutting edges adapted to have rolling point contact with the periphery of the anvil roll whereby to impart a scallop cut along each side edge of a web being processed, and the last roll of said radial series having thereon radially projecting web severing blades having straight edge line contact with the anvil roll whereby to sever individual articles from a web being processed.

7. In an apparatus for cutting articles from web material, a conveyor, means for cutting material into individual articles and depositing the same on the conveyor, article take-off means above and extending over the conveyor, cam means beneath the take-off means operative to lift an article from the conveyor into engagement with the take-off means, means for driving the conveyor, and an operating connection between the conveyor driving means and the cam means.

8. In an apparatus for cutting articles from web material, a conveyor, means for cutting material into individual articles and depositing them on the conveyor, an endless belt disposed above and transversely of the conveyor, a cam rotatable beneath the conveyor and having a riser portion adapted to engage an article on the conveyor and lift it into engagement with said belt, and means for actuating said conveyor, cam and belt in synchronism.

9. In an apparatus for cutting articles from web material, an endless conveyor, means for cutting material into individual articles and depositing them on a flight of the conveyor, an endless belt extending over, across, and away from the article carrying flight of the conveyor, a cam rotatable between the conveyor flights and having a riser portion adapted to engage and lift an article from the conveyor into operative contact with said belt whereby to move the article away from the conveyor, and means for operating said conveyor, cam, and belt in synchronism.

10. In an apparatus for cutting articles from web material, an endless conveyor, means for cutting material into individual articles and depositing them on the conveyor, means operative above the conveyor for removing articles therefrom, a rotatable shaft, a cam fixed on said shaft and engaging said removing means to raise and lower the same relative to the conveyor, a second cam fixed on said shaft and adapted to engage and lift an article from the conveyor into engagement with said removing means when it is lowered, and means for operating said conveyor, cam shaft, and removing means in synchronism.

11. In an apparatus for cutting articles from web material, a conveyor, means for cutting material into individual articles and depositing them on the conveyor, a boom extending over and across the conveyor and supported for raising and lowering movement relative to the conveyor, a cam shaft, cams fixed thereon, one of said cams engaging said boom to raise and lower the same as the cam is actuated, pulleys carried by said boom, an endless belt trained over said pulleys, another of said cams engaging articles on the conveyor to lift an article into operative engagement with said belt when the boom is lowered and means for actuating the conveyor, cam shaft, and endless belt in synchronism.

12. Article transfer means comprising in combination a conveyor, means for depositing articles in spaced relation thereon, a cam rotatable in proximity to said conveyor to lift articles therefrom periodically, a plate disposed horizontally in spaced relation above the conveyor to receive and hold articles lifted from the conveyor by said cam, and means associated with said plate operative to engage and move therefrom articles deposited on the plate by action of the cam.

13. Article transfer means comprising in combination a conveyor, means for depositing articles in spaced relation thereon, a plate disposed horizontally in spaced relation above the conveyor and having a slot directed longitudinally of the conveyor, a cam rotatable in proximity to the conveyor and having a riser portion movable above the conveyor and above the plate through its slot to lift articles from the conveyor and deposit them on the plate, and means operative to carry articles from the plate away from the conveyor.

14. A sanitary pad forming machine comprising cutter means for shaping and severing individual pads from a web of cellulosic material, means for feeding a web of such material thereto, a traveling conveyor arranged to receive pads from the cutter means, pad engaging means operative to space apart pads on the conveyor, a plurality of pad take-off means arranged serially along the conveyor, means adjacent each take-off means operative to present single pads to the take-off means, said pad presenting means being adapted to bypass pads at intervals to the succeeding take-off means, and said take-off means operating to move the pads in the direction of their longitudinal axes.

15. A sanitary pad forming machine comprising cutter means for shaping and severing pads from a web of material, means for feeding a web of material thereto, a support arranged to receive pads from the cutter means, pad engaging means operative through the support to slide pads therealong, a plurality of take-off means above said support in spaced relation longitudinally thereof, stripper means movable through said support to engage and lift pads from the support into contact with the take-off means whereby the pads are moved off and away from the support, and means in operating connection with each take-off means to render the take-off means ineffective at predetermined intervals whereby pads may be moved along the support to succeeding take-off means.

16. In a rotary die cutter assembly, a pair of uprights in parallel spaced relation, an anvil roll journalled at its ends in said uprights, a plurality of die rolls journalled in the uprights in radial relation to the anvil roll, radial cutter dies on said die rolls and disposed in circumferentially spaced relation, bearer rings on the ends of said rolls in contact with the anvil roll, said cutter dies having cutting edges curved in the arc of a circle having the same diameter as that of the bearer rings, and means for rotating all said rolls with the die rolls moving oppositely to the anvil roll.

17. In a pad forming machine, rotary cutter means operative in seriatim to fashion pad ends at the sides of a web of material and to sever individual pads, means for feeding a web of material to the cutter means, conveyor means arranged to move pads from the cutter means in one direction, a plurality of serially disposed take-off means operative to move pads from the conveyor means in a direction away from the conveyor means, and means operative on pads on the conveyor means to pass pads freely past individual take-off means at predetermined intervals.

JOHN W. HEWITT, Jr.

REFERENCES CITED

The following references are of record in the file of this patent:

UNITED STATES PATENTS

| Number | Name | Date |
| --- | --- | --- |
| 1,936,485 | Schreck | Nov. 21, 1933 |